(12) United States Patent
Nozaki et al.

(10) Patent No.: US 10,493,719 B2
(45) Date of Patent: Dec. 3, 2019

(54) LAMINATED CLOTH

(71) Applicant: W. L. GORE & ASSOCIATES, CO., LTD, Tokyo (JP)

(72) Inventors: Yuichiro Nozaki, Tokyo (JP); Satoshi Kobayashi, Fukui (JP)

(73) Assignee: W. L. Gore & Associates, Co., Ltd., Tokyo (JP)

( * ) Notice: Subject to any disclaimer, the term of this patent is extended or adjusted under 35 U.S.C. 154(b) by 750 days.

(21) Appl. No.: 14/355,448

(22) PCT Filed: Oct. 30, 2012

(86) PCT No.: PCT/JP2012/078045
§ 371 (c)(1),
(2) Date: Apr. 30, 2014

(87) PCT Pub. No.: WO2013/065688
PCT Pub. Date: May 10, 2013

(65) Prior Publication Data
US 2014/0287643 A1    Sep. 25, 2014

(30) Foreign Application Priority Data
Nov. 1, 2011   (JP) ................................ 2011-240148

(51) Int. Cl.
*B32B 5/02*        (2006.01)
*B32B 7/02*        (2019.01)
(Continued)

(52) U.S. Cl.
CPC ................ *B32B 5/026* (2013.01); *B32B 5/02* (2013.01); *B32B 5/022* (2013.01); *B32B 5/024* (2013.01);
(Continued)

(58) Field of Classification Search
CPC ........... B32B 27/12; B32B 5/026; B32B 5/06; D04B 1/00; D06M 17/00
(Continued)

(56) References Cited

U.S. PATENT DOCUMENTS

| 4,733,546 A | * | 3/1988 | Toda ...................... D04B 1/104 66/195 |
| 5,268,212 A | * | 12/1993 | Lumb .................... A41D 31/02 156/235 |

(Continued)

FOREIGN PATENT DOCUMENTS

| JP | 55-7483 | 1/1980 |
| JP | 2001-303408 | 10/2001 |

(Continued)

OTHER PUBLICATIONS

Spencer, David J. Knitting Technology: A Comprehensive Handbook and Practical Guide 3rd Edition. Woodhead Publishing Limited, Cambridge, England. pp. 94-99 and 146-151.*
(Continued)

*Primary Examiner* — Jenna L Johnson
(74) *Attorney, Agent, or Firm* — Greenberg Traurig, LLP

(57) ABSTRACT

Provided is a laminated body, said laminated body being a laminated cloth the back surface of which has excellent properties against tangling and abrasion and good separability from the skin and which has a good texture and a favorable appearance and is comfortable to wear when made into clothing. The laminated cloth includes a front surface layer, a middle layer and a back surface layer, said layers being stacked one on another, wherein: the front surface layer comprises one member selected from the group consisting of a woven fabric, a knitted fabric and a non-woven fabric; the middle layer comprises a resin film or a non-woven fabric; and the back surface layer comprises a circular knitted fabric in which filament yarn of 60 dtex or less
(Continued)

is used at least in part thereof and which is configured from knitting stitches and tack stitches, 9 to 72 said tack stitches being disposed per area of 12 wales×12 courses.

8 Claims, 4 Drawing Sheets

(51) Int. Cl.
    *B32B 27/12*     (2006.01)
    *D04B 1/10*     (2006.01)
    *B32B 5/26*     (2006.01)
    *D06M 17/10*     (2006.01)
    *B32B 27/30*     (2006.01)
    *B32B 27/32*     (2006.01)
    *B32B 27/34*     (2006.01)
    *B32B 27/36*     (2006.01)
    *B32B 27/40*     (2006.01)

(52) U.S. Cl.
    CPC ............... *B32B 5/26* (2013.01); *B32B 7/02* (2013.01); *B32B 27/12* (2013.01); *B32B 27/304* (2013.01); *B32B 27/308* (2013.01); *B32B 27/32* (2013.01); *B32B 27/34* (2013.01); *B32B 27/36* (2013.01); *B32B 27/40* (2013.01); *D04B 1/102* (2013.01); *D06M 17/10* (2013.01); *B32B 2250/20* (2013.01); *B32B 2262/0207* (2013.01); *B32B 2262/0215* (2013.01); *B32B 2262/0238* (2013.01); *B32B 2262/0246* (2013.01); *B32B 2262/0253* (2013.01); *B32B 2262/0261* (2013.01); *B32B 2262/0276* (2013.01); *B32B 2262/0284* (2013.01); *B32B 2262/0292* (2013.01); *B32B 2307/554* (2013.01); *B32B 2307/712* (2013.01); *B32B 2307/724* (2013.01); *B32B 2307/7265* (2013.01); *B32B 2307/73* (2013.01); *B32B 2437/00* (2013.01); *D10B 2403/0112* (2013.01); *D10B 2505/18* (2013.01); *Y10T 442/3707* (2015.04); *Y10T 442/3854* (2015.04); *Y10T 442/444* (2015.04); *Y10T 442/45* (2015.04)

(58) Field of Classification Search
    USPC ........................................................ 442/312
    See application file for complete search history.

(56) References Cited

U.S. PATENT DOCUMENTS

| | | | | |
|---|---|---|---|---|
| 2003/0068949 | A1* | 4/2003 | Ishii | ............... A41D 31/0033 442/239 |
| 2007/0166503 | A1* | 7/2007 | Hannigan | ........ A41D 31/0027 428/59 |

FOREIGN PATENT DOCUMENTS

| | | |
|---|---|---|
| JP | 2009-056765 | 3/2009 |
| JP | 2010-201811 | 9/2010 |
| JP | 2011-099179 | 5/2011 |

OTHER PUBLICATIONS

International Search Report, PCT/JP2012/078045, 2 pages, dated Feb. 2013.

\* cited by examiner

LAMINATED CLOTH

TECHNICAL FIELD

The present invention relates to a laminated cloth used for various garments typified by rainwear, mountain wear, sportswear, outdoor workwear, and the like.

BACKGROUND ART

Conventionally, in applications for garments which are required to have windbreaking ability, water resistance/water vapor permeability, or the like, laminated cloths have been provided which achieve the required performances by stacking a resin film on one surface of a fabric (front fabric), such as a woven fabric, a knitted fabric, or a non-woven fabric, by means of coating, lamination, or the like.

However, these laminated cloths have such problems that the resin film is easily peeled or damaged and hence the performances deteriorate, and that direct contact of the resin film with the skin of a wearer gives a sticky feel.

In this respect, laminated cloths have been proposed in which a fabric is stacked also on a surface opposite from the surface of the resin film on which the front fabric is stacked to prevent direct contact of the resin film with the skin and the like. Thus, the resin film is prevented from being peeled, being damaged, and giving a sticky feel.

For example, a laminated cloth has been disclosed in which a water-repellent nylon taffeta, a porous polytetrafluoroethylene film treated with a hydrophilic polyurethane resin, and a nylon tricot are stacked on each other (Patent Document 1).

A fabric used for a back surface (skin-side surface) of the laminated cloth as described in Patent Document 1 is required to be thin and light to avoid increase in thickness and mass per unit area of the entire laminated cloth, to give no sticky feel upon contact with the skin, and to reduce the sticky feel of the resin film present inside the fabric. For this reason, a tricot knitted fabric in which a rugged structure is formed on a surface has been conventionally used.

However, when a tricot knitted fabric is used for the back surface, there arises such a problem that the rugged structure of the tricot knitted fabric is likely to be tangled with a button, hooks of a hook-and-loop fastener (for example, a hook-and-loop fastener manufactured by KURARAY FASTENING CO., LTD under the trade name of "NEW ECOMAGIC" (registered trademark)), and the like, so that the tricot knitted fabric degrades because of abrasion.

Meanwhile, a water vapor permeable/water resistant laminated cloth has been proposed in which a water vapor permeable/water resistant layer is stacked on one surface of a base cloth, and further a cloth obtained by using textured yarn having a total fineness of 16 dtex or less is stacked on the water vapor permeable/water resistant layer (Patent Document 2).

However, the water vapor permeable/water resistant laminated cloth as described in Patent Document 2 is intended exclusively to be excellent in lightness in weight. When the cloth is a woven fabric, the cloth has a problem of the texture, while when the cloth is a knitted fabric, the cloth has problems associated with physical properties, such as degradation due to tangling or abrasion.

For the above-described reasons, no laminated cloth has been achieved yet in which the back surface is excellent in terms of all the physical properties associated with resistance to tangling and abrasion, separability from the skin, texture, and the like under the current situation.

PRIOR ART DOCUMENT

Patent Document

Patent Document 1: Japanese patent application Kokai publication No. Sho 55-7483
Patent Document 2: Japanese patent application Kokai publication No. 2010-201811

SUMMARY OF THE INVENTION

Problem to be Solved by the Invention

In view of the above-described points, an object of the present invention is to provide, in the field of a laminated cloth having applications for garments which are required to have windbreaking ability, water resistance/water vapor permeability, or the like, and other applications, a laminate which solves the problems of the physical properties associated with resistance to tangling and abrasion, the separability from the skin, and the texture of the back surface of the laminate, and which is comfortably to wear when made into a garment.

Means for Solving the Problem

To solve the problems, a laminated cloth of the present invention has the following configuration (1).
(1) A laminated cloth comprising a front surface layer, a middle layer, and a back surface layer stacked on each other, wherein
one selected from the group consisting of a woven fabric, a knitted fabric, and a non-woven fabric is used for the front surface layer,
a resin film or a non-woven fabric is used for the middle layer,
a circular knitted fabric having knit stitches and tuck stitches is used for the back surface layer,
filament yarn of 60 dtex or less is used in at least part of the circular knitted fabric, and
the number of the tuck stitches of the circular knitted fabric is 9 to 72 per area of 12 wales×12 courses.
In addition, the laminated cloth of the present invention further preferably has any one of the following configurations (2) to (14).
(2) The laminated cloth according to (1), wherein
the number of the knit stitches of the circular knitted fabric is 1,000 or more and 20,000 or less per 6.45 cm$^2$.
(3) The laminated cloth according to (1), wherein
the number of the knit stitches of the circular knitted fabric is 1,000 or more and 15,000 or less per 6.45 cm$^2$.
(4) The laminated cloth according to (1), wherein
the number of the knit stitches of the circular knitted fabric is 2,000 or more and 10,000 or less per 6.45 cm$^2$.
(5) The laminated cloth according to (1), wherein
the number of the knit stitches of the circular knitted fabric is 2,500 or more and 9,000 or less per 6.45 cm$^2$.
(6) The laminated cloth according to (1), wherein
the number of the knit stitches of the circular knitted fabric is 3,000 or more and 8,000 or less per 6.45 cm$^2$.
(7) The laminated cloth according to any one of (1) to (6), wherein
the circular knitted fabric is a single circular knitted fabric.

(8) The laminated cloth according to any one of (1) to (7), wherein the filament yarn has a fineness of 36 dtex or less.

(9) The laminated cloth according to any one of (1) to (8), wherein two or more types of filament yarn are used as the filament yarn.

(10) The laminated cloth according to any one of (1) to (9), wherein two or more types of filament yarn having different finenesses are used as the filament yarn.

(11) The laminated cloth according to any one of (1) to (10), wherein the middle layer is obtained by using a resin film or a non-woven fabric having an air permeability of 50 cc/cm$^2$·sec or less, the air permeability being measured by the method A (Frazier-type) of Japanese Industrial Standard (JIS)-L-1096.

(12) The laminated cloth according to any one of (1) to (11), wherein the middle layer is obtained by using a resin film or a non-woven fabric having a degree of waterproof property (water resistance) of 100 cm or more and a water vapor permeability of 50 g/m$^2$·h or more, the degree of waterproof property being measured by the method A of Japanese Industrial Standard (JIS) L 1092, the water vapor permeability being measured by the method B-2 of JIS L 1099.

(13) The laminated cloth according to any one of (1) to (12), wherein the circular knitted fabric has a mass per unit area of 50 g/m$^2$ or less.

(14) The laminated cloth according to any one of (1) to (13), wherein the circular knitted fabric has a cover factor (CF) of 200 to 800.

Effects of the Invention

In the field of a laminated cloth having applications for garments which are required to have windbreaking ability, water resistance/water vapor permeability, or the like, and other applications, the present invention can achieve a cloth having the following characteristics. Specifically, since a back cloth having a rugged structure is used, the back surface (skin side surface) has good separability from the skin. Moreover, since the rugged structure is fine, the back surface has good physical properties such as wear resistance and property of preventing the back surface from being tangled by a hook-and-loop fastener, a button, or the like. In addition, the cloth has good texture.

Since the laminated cloth of the present invention has the above-described characteristics, a laminated cloth suitable for various garments such as rainwear, mountain wear, sportswear, and outdoor workwear is provided.

BRIEF DESCRIPTION OF THE DRAWINGS

FIG. 8 is a structural diagram showing a single circular knitted fabric used in a still another example of the laminated cloth of the present invention.

FIG. 9 is a structural diagram showing a single circular knitted fabric used for a laminated cloth of Comparative Example.

MODES FOR CARRYING OUT THE INVENTION

Hereinafter, a laminated cloth of the present invention is described with reference to the drawings.

The laminated cloth of the present invention includes a front surface layer, a middle layer, and a back surface layer stacked on each other, wherein one selected from the group consisting of a woven fabric, a knitted fabric, and a non-woven fabric is used for the front surface layer, a resin film or a non-woven fabric is used for the middle layer, a circular knitted fabric having knit stitches and tuck stitches is used for the back surface layer, filament yarn of 60 dtex or less is used in at least part of the circular knitted fabric, and the number of the tuck stitches of the circular knitted fabric is 9 to 72 per area of 12 wales×12 courses. The components are described one by one below.

A conventional circular knitted fabric is constituted of stitches. Hence, the circular knitted fabric has a soft texture, because the interlocking of constituent yarn allows loose movement. However, the circular knitted fabric has a drawback of poor physical properties associated with resistance to tangling. The physical properties associated with resistance to tangling are improved by increasing the knitting density of the fabric. However, excessive increase in knitting density results in a high mass per unit area of the fabric, and hence makes the fabric unsuitable for aback cloth. In this respect, plain stitch fabrics, which are the most lightweight among circular knitted fabrics, have been often used. However, the plain stitch fabrics have such problems that the weight reduction increases the occurrence of a run in a case where the fabric is stretched or other cases, and this makes the fabrics difficult to handle, and that when a wearer perspires, the separability from the skin is poor because of the flat surface.

In this respect, it is important that the circular knitted fabric be a circular knitted fabric having knit stitches and tuck stitches. A tuck stitch is a stitch formed by a strand in a state of not actually forming any stitch but being hooked on a knit stitch, as indicated by A in FIG. 1.

Figure 1:
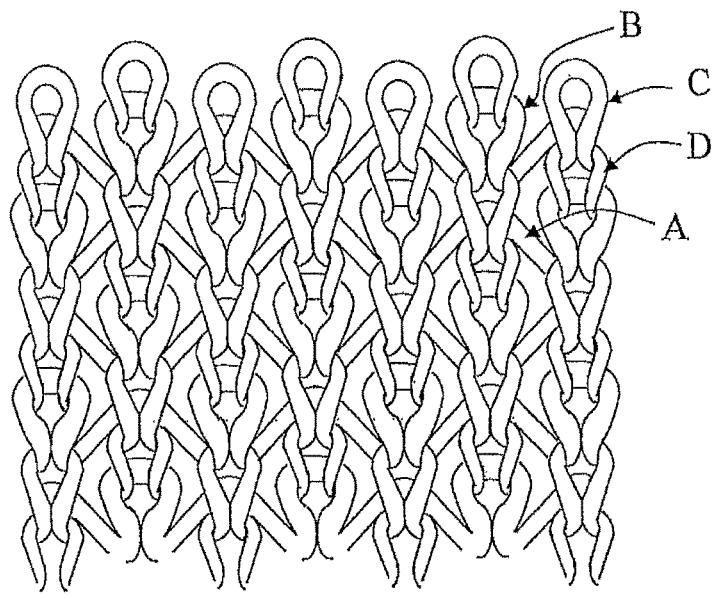
FIG. 1 is a schematic diagram showing an example of a single circular knitted fabric usable for a laminated cloth of the present invention.
Figure 2:
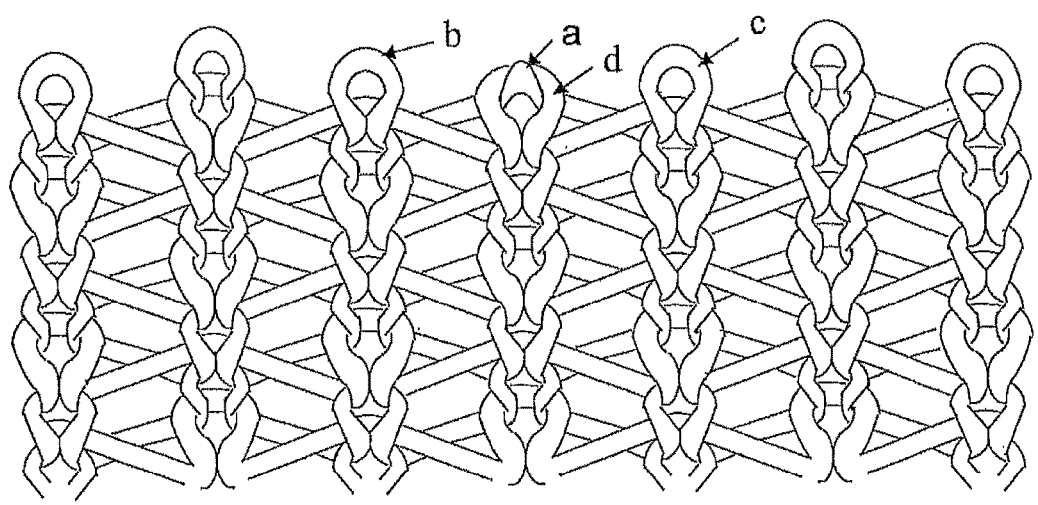
FIG. 2 is a schematic diagram showing a state where the example of the single circular knitted fabric usable for the laminated cloth of the present invention is stretched.
Figure 3:
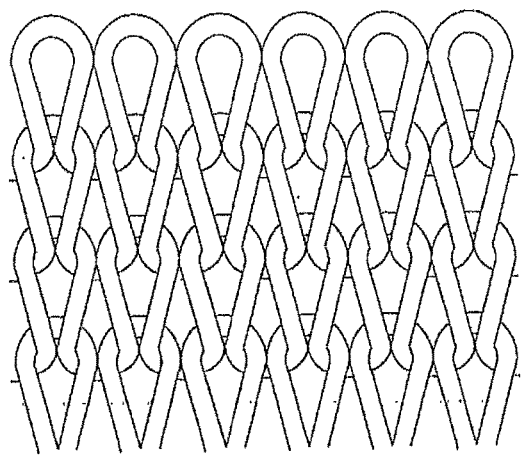
FIG. 3 is a schematic diagram of a plain-stitch single circular knitted fabric, which cannot constitute a back surface layer of the laminated cloth of the present invention.
Figure 4:
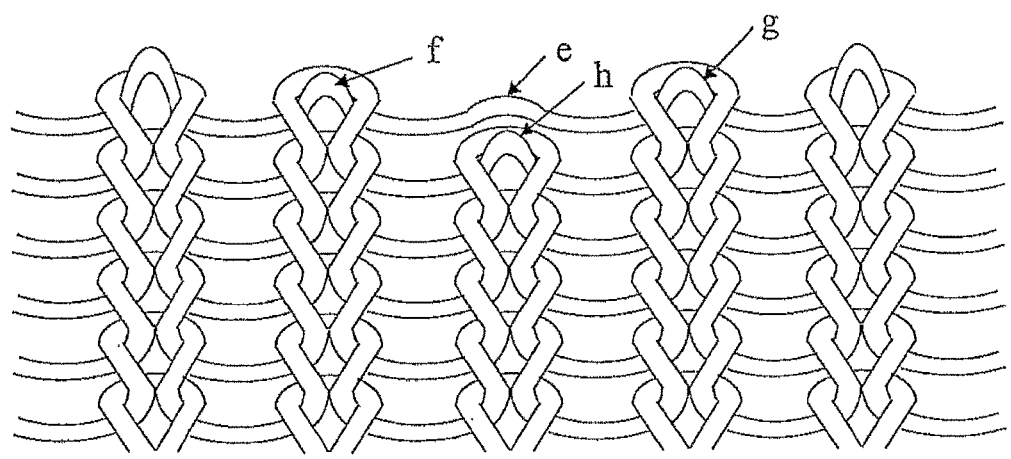
FIG. 4 is a schematic diagram illustrating a state where the plain-stitch single circular knitted fabric shown in FIG. 3 is stretched in the width direction.

In contrast, a plain stitch fabric is a knitted fabric having uniform stitches as shown in FIG. 3. When the plain stitch fabric is stretched in the width direction as shown in FIG. 4, a force is applied uniformly to each stitch. After a stitch e is broken, stitches f, g, and h are also broken continuously to cause a run. On the other hand, in the case of a structure including tuck stitches, the knitted fabric has stitches having non-uniform sizes as shown in FIG. 1. For this reason, the fabric is such that even if a stitch a is broken upon stretching in the width direction as shown in FIG. 2, a force is not applied uniformly to the stitches b, c, and d, so that the stitches are less likely to be broken, and the fabric becomes resistant to a run. Since the fabric is resistant to a run, the fabric is easy to handle in dyeing process and lamination process.

Moreover, in the knitted fabric including tuck stitches, the sizes of the knit stitches are non-uniform. Hence, in the fabric as shown in FIG. 1, the knit stitch B has a raised structure, while the knit stitches C and D have recessed structures. Thus, the fabric as a whole has a rugged structure. For this reason, the contact area between the skin and the knitted fabric is reduced, and this leads to a good separability from the skin.

In addition, since a circular knitted fabric is constituted of stitches, the circular knitted fabric has spaces. When the spaces are wide, the portions become more see-thru, while when the spaces are narrow, the portions become less see-thru. If the variations of spaces are continuously occurs, a drawback such as a longitudinal line (a line in the longitudinal direction) or a lateral line (a line in the width direction) is caused. In a knitted fabric having uniform stitches as in a plain stitch fabric, this drawback is noticeable even when the difference among the spaces is slight. On the other hand, in a knitted fabric including tuck stitches, the stitches are non-uniform, although having certain regularity. Moreover, the threads of the tuck stitches are present among the knit stitches. Hence, the spaces are non-uniform, and this drawback is less noticeable, if the drawback is caused by slight difference among the spaces. In addition, this drawback becomes more noticeable, as the density increases.

Moreover, it is important that the number of the tuck stitches be in a range from 9 to 72 per area of 12 wales×12 courses. As long as the number of the tuck stitches is within the above-described range, the fabric may have any structure, but is preferably a single circular knitted fabric considering the ease of weight reduction.

The number of courses here does not refer to the number of the knit stitches in the longitudinal direction, which is ordinarily employed, but refers to the number of strands of yarn fed. One feeder for a knitted fabric structure is counted as one course. In other words, the "area of 12 wales×12 courses" means an area defined by 12 knit stitches in the width direction (wales) and 12 strands of yarn fed in the longitudinal direction (courses). For example, as shown in a knitting method in FIG. 6, the number of tuck stitches A per area of 12 wales×12 courses is 36 in a case of a single circular knitted fabric in which a single perfect knitting structure is formed by using four feeders F1 to F4, and using four strands of yarn, namely strands j, k, and l. In other words, in the case of this structure, 12 tuck stitches are present in a single perfect knitting structure (in which the number of strands of yarn fed is four) per 12 wale. The value is converted to a value for 12 courses as follows: 12 tuck stitches×12 courses/4 courses=36 stitches. Note, however, that, for a double circular knitted fabric, an average value of the number of tuck stitches per area of 12 wales×12 courses on a cylinder surface and the number of tuck stitches per area of 12 wales×12 courses on a dial surface is employed as the number of tuck stitches per area of 12 wales×12 courses.

The following problems arise in association with the number of tuck stitches per area of 12 wales×12 courses. Specifically, when the number of tuck stitches is less than nine, the tuck stitches are so few that the effect on the separability from the skin and the effect of preventing a run are reduced. Meanwhile, when the number of tuck stitches exceeds 72, the tuck stitches are so many that the increased amount of the yarn used leads to increase in mass per unit area, and makes productivity poor. The number of the tuck stitches is preferably in a range from 18 to 54, and more preferably in a range from 24 to 48.

Moreover, when tuck stitches are continuously arranged in the same wales, the rugged structure can be more noticeable. A tuck stitch has a structure of being hooked on a knit stitch. Here, when tuck stitches are continuously provided in a single wale, the strands of the yarn of the tuck stitches are stacked on each other at the same knit stitch. Hence, the raised structure of the stacked portion becomes noticeable. However, if the raised structure becomes excessively noticeable, physical properties associated with resistance to tangling become poor. Hence, the number of tuck stitches continuously arranged in a single wale is preferably 6 or less and more preferably 5 or less.

In addition, characteristics of the circular knitted fabric vary also depending on the number of knit stitches per 6.45 $cm^2$. The number of the knit stitches per 6.45 $cm^2$ is a value obtained by multiplying the number of wales per 2.54 cm by the number of courses per 2.54 cm. When the number of the knit stitches is large, the resultant fabric becomes dense with narrow spaces between stitches. Meanwhile, when the number of the knit stitches is small, the resultant fabric becomes coarse with wide spaces between stitches. Note, however, that, for a double circular knitted fabric, the total value of the number of knit stitches per 6.45 $cm^2$ on the cylinder surface and the number of knit stitches per 6.45 $cm^2$ on the dial surface are employed as the number of knit stitches per 6.45 $cm^2$.

As described above, the circular knitted fabric used in the present invention includes tuck stitches, and hence has a rugged structure. Here, if fine recessed and raised structures are densely provided, the separability from the skin, the texture, and the physical properties associated with resistance to tangling can be further improved. However, if the number of knit stitches increases excessively, the mass per unit area is so large that influences on the entire laminated cloth increases. From such viewpoints, the number of knit stitches per 6.45 $cm^2$ is preferably in a range from 1,000 or more to 20,000 or less. The number of knit stitches per 6.45 $cm^2$ is more preferably in a range from 1,000 or more to 15,000 or less, still more preferably in a range from 2,000 or more to 10,000 or less, further preferably in a range from 2,500 or more to 9,000 or less, and most preferably in a range from 3,000 or more to 8,000 or less.

In the circular knitted fabric, filament yarn of 60 dtex or less is preferably used in at least part of the circular knitted fabric. A filament yarn of 48 dtex or less is more preferable, a filament yarn of 36 dtex or less is further preferable, and a filament yarn of 24 dtex or less is the most preferable. The ratio of the filament yarn to fibers constituting the fabric is most preferably 100% by mass, because a higher ratio leads to a smaller mass. In addition, the ratio is preferably at least 25% by mass or more, and more preferably 50% by mass or more.

The number of filaments in the filament yarn is preferably in a range from 1 to 72, and more preferably in a range from 3 to 36. A larger number of filaments makes it possible to obtain a laminated cloth with a softer texture. However, if the number of filaments is too much, the single fiber fineness excessively decreases, so that physical properties associated with resistance to tangling and abrasion become poor.

The filament yarn is preferably made of a synthetic fiber from the viewpoint of strength, durability, texturing processability, and costs. In particular, a polyester fiber, a polyamide fiber, or a polypropylene fiber is preferable. However, the yarn is not limited to those of synthetic fibers, as long as the yarn, is a filament yarn. For example, it is possible to use a regenerated fiber such as rayon or cuprammonium rayon or a semi-synthetic fiber such as acetate or triacetate to enhance moisture-absorption characteristics and color development characteristics. Furthermore, it is possible to use a biodegradability fiber, a side-by-side fiber, an electrically conductive fiber, a fluorine-containing fiber, or the like.

As the filament yarn, untreated yarn which is straight yarn not subjected to any special texturing process after a spinning process, false-twist textured yarn subjected to a texturing process, air intermingled filament yarn, air interlaced yarn, twisted yarn, or the like can be used. To make the back cloth less likely to be tangled by a hook-and-loop fastener or the like, yarn having good filament integrity is preferably used. In particular, untextured yarn, which is straight yarn subjected to slight air interlacing to provide the integrity, is preferable considering the physical properties associated with resistance to tangling and abrasion, as well as texture.

Figure 6:
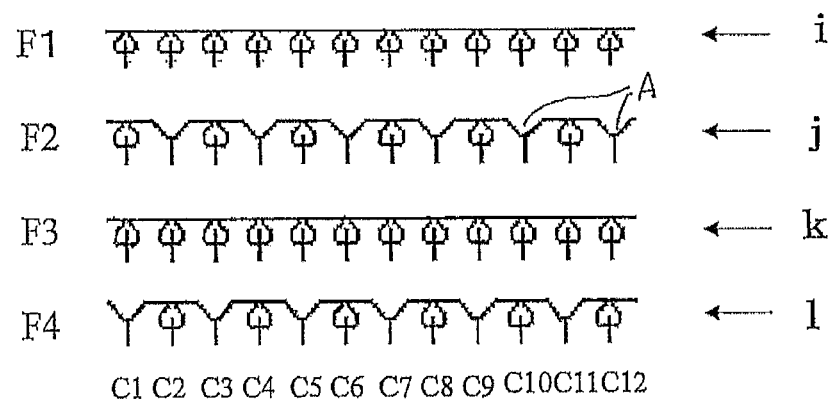
FIG. 6 is a structural diagram showing a single circular knitted fabric used in an example of the laminated cloth of the present invention.

In addition, by using two or more different types of fibers for the filament yarn, the rugged structure can be adjusted, and the appearance and texture can be modified. The difference in type of the fibers may be difference in fineness, raw material, texturing process, single fiber fineness, cross-sectional shape, or the like. For example, by using fibers having different finenesses, the rugged structure can be adjusted. In the structure of FIG. 6, the fiber used for F2 and F4 has great influence on the raised portions. Hence, when a coarse fiber is used for F2 and F4, and a fine fiber is used for F1 and F3, a fabric can be obtained which has a light weight and in which a more noticeable rugged structure is formed. In addition, when the fiber used for F2 and F4 is finer than the fiber used for F1 and F3, a fabric can be obtained in which the rugged structure is formed relatively moderately.

The following are other examples of the use of different types of fibers. Specifically, a pattern can be provided by using a polyamide fiber and a polyester fiber and dyeing them in different colors; a pattern based on difference in luster can be provided by using polyamide fibers having different titanium oxide contents; and a soft texture can be obtained, while reducing decrease in strength, by using yarn having a fine single fiber fineness only as the yarn forming the raised portions.

After knitted by fitting a knitting machine and knitting conditions to desired conditions and the like, the circular knitted fabric can be finished to have a desired total number of knit stitches by final adjustment of the number of wales and the number of courses also in a dyeing process.

The knitting machine is not particularly limited, as long as the knitting machine is a circular knitting machine. Here, to obtain a desired number of the knit stitches, a single circular knitting machine with a gauge of 28 or more is preferably used for a single circular knitted fabric. A single circular knitting machine with a gauge of 36 or more is preferably used to obtain a further increased number of knit stitches. For a double circular knitted fabric, a double circular knitting machine with a gauge of 22 or more is preferably used, and a double circular knitted fabric with a gauge of 28 or more is more preferable.

As for a method for the dyeing process, the process can be carried out by a conventionally known dyeing method.

The fabric used for the front surface layer of the laminated cloth of the present invention is any one of a woven fabric, a knitted fabric, and a non-woven fabric. The structure is not particularly limited, and types of the woven fabric which can be used include a plain weave fabric, a twill weave fabric, a satin weave fabric, a basket weave fabric, a steep twill weave fabric, a weft backed weave fabric, a warp backed weave fabric, or the like. Types of the knitted fabric which can be used include those obtained by plain stitch, 1×1 plain stitch, moss stitch, rib stitch, interlock stitch (smooth stitch), pearl stitch, ponte roma stitch, milano rib stitch, blister stitch, and the like, which are weft knitted fabrics, as well as those obtained by single denbigh stitch, single cord stitch, single atlas stitch, half tricot stitch, double denbigh stitch, satin stitch, and the like, which are warp knitted fabrics. Types of the non-woven fabric which can be used include a short fiber non-woven fabric, a filament fiber non-woven fabric, a flash-spun non-woven fabric, a melt-blown non-woven fabric, and the like. In addition, a material constituting the fabric used for the front surface layer can be selected, as appropriate, from natural fibers such as cotton and hemp and synthetic fibers such as polyester fibers and polyamide fibers depending on the application of the laminated cloth. For example, when the laminated cloth of the present invention is used for mountain wear for which strength, durability, light weight, and the like are considered to be important, it is preferable to use a woven fabric constituted of a polyester fiber, a polyamide fiber, or the like. When the laminated cloth of the present invention is used for sportswear for which stretchability, light weight, and the like are considered to be important, it is preferable to use a knitted fabric constituted of a polyester fiber, a polyamide fiber, or the like. In addition, if necessary, the fabric used for the front surface layer can be subjected to a water-repellent treatment process, an anti-static treatment process, or the like.

In addition, as the fabric used for the front surface layer, "a circular knitted fabric having knit stitches and tuck stitches, in which filament yarn of 60 dtex or less is used in at least part of the fabric, and the number of the tuck stitches is 9 to 72 per area of 12 wales×12 courses" may be used as in the case of the fabric used for the above-described back surface. In such a case, specifications of the fabric may be completely the same as those of the circular knitted fabric used for the back surface, or a fabric may be used which falls within the above-described ranges of the fineness of the filament yarn and number of tuck stitches, but which has specific points different from those of the back surface layer.

The resin film or the non-woven fabric used for the middle layer of the laminated cloth of the present invention is not particularly limited, as long as the resin film or the non-woven fabric has a flexibility sufficient for garment applications. As the resin film, it is possible to use, for example, a film of a polyurethane resin, a polyester resin such as polyethylene terephthalate or polybutylene terephthalate, an acrylic resin, a polyolefin resin such as polyethylene or a polyolefin, a polyamide resin, a vinyl chloride resin, a synthetic rubber, a natural rubber, a fluorine-containing resin, or the like. Note that the "resin film" herein is a concept including ordinary non-air permeable resin thin films, as well as resin thin films formed to have a porous structure by which a moderate air permeability or water vapor permeability is provided as described later, and the like. For example, it is possible to use a film of a porous polytetrafluoroethylene (PTFE) known by the brand name of "Gore-Tex" (registered trademark), or the like.

As the non-woven fabric, it is possible to use, as appropriate, a short fiber non-woven fabric, a filament fiber non-woven fabric, a flash-spun non-woven fabric, a melt-blown non-woven fabric, an electrospun non-woven fabric, or the like of polyester, polypropylene, polyethylene, polyvinyl alcohol, polyamide, acrylonitrile, acetate, cellulose, polyurethane or the like. In addition, a stack of multiple sheets thereof may be used.

Note that, in the present invention, the "middle layer" means, so to speak, an "intermediate layer" positioned between the front surface layer and the back surface layer. The middle layer (intermediate layer) may be formed of a single layer, but is not limited to such a case. Multiple layers of the same type or multiple layers of different types as a whole may form the middle layer (intermediate layer).

The thickness of the middle layer is preferably 1 µm or more and 300 µm or less, and more preferably 5 µm or more and 100 µm or less. A thickness of the middle layer of less than 1 µm is not preferable, because problems associated with handleability arise during production. Meanwhile, when the thickness of the middle layer exceeds 300 µm, the flexibility of the plastic film tends to be so impaired that the film becomes unsuitable for garments. The thickness of the middle layer is measured based on a thickness measured with a dial thickness gauge (measured by using a SM-1201 1/1000-mm dial thickness gauge manufactured by TECLOCK corporation without applying any load except the load of the spring of the main body).

On the basis of further examination conducted by the present inventors, it is preferable to use, as the middle layer, a film or a non-woven fabric having windbreaking ability or water resistance/water vapor permeability.

When a windbreaking film or a windbreaking non-woven fabric is used as the middle layer, windbreaking ability can be provided to the laminated cloth obtained by the present invention. Meanwhile, when a water resistant/water vapor permeable film or a water resistant/water vapor permeable non-woven fabric is used, water resistance/water vapor permeability can be provided to the laminated cloth obtained by the present invention. Note that a film or a non-woven fabric having water resistance/water vapor permeability also has windbreaking ability, in general.

Specifically, for applications where windbreaking ability are especially required, as in a windbreaker or the like, it is preferable to use, for the middle layer, a resin film or a non-woven fabric having an air permeability or 50 cc/cm²·sec or less. Here, the air permeability is measured by the method A (Frazier-type) of Japanese Industrial Standard (JIS) L 1096. The air permeability is more preferably 10 cc/cm²·sec or less, and further preferably 0.1 cc/cm²·sec or less. A lower limit of a preferred range is generally 0.00 to 0.02 cc/cm²·sec.

On the other hand, for applications where water resistance is especially required, as in the case of a rain ware or the like, it is preferable to use, for the middle layer, a resin film or a non-woven fabric having a degree of waterproof property (water resistance) of 100 cm or more. Here, the degree of waterproof property (water resistance) is determined by the method A of Japanese Industrial Standard (JIS) L 1092. The degree of waterproof property is more preferably 200 cm or more. An upper limit of a preferred range is 1000 to 5000 cm, in general.

Moreover, to impart water resistance/water vapor permeability to an excellent rain ware having such characteristics, a water vapor permeability is preferably 50 g/m²·h or more. Here, the water vapor permeability is measured by the method B-2 of Japanese Industrial Standard (JIS) L 1099. The water resistance/water vapor permeability means that both "water resistance" for blocking water and "water vapor permeability" for allowing water vapor permeation are provided. By setting the "degree of waterproof property" and the "water vapor permeability" within the above-described ranges, a desired water resistance/water vapor permeation performance can be provided. For example, when the laminated cloth of the present invention is processed into a garment and used, water vapor in sweat discharged from the body of the wearer is released to the outside through the laminated cloth, so that stuffy feel can be prevented during wearing. The water vapor permeability is more preferably 100 g/m²·h or more. An upper limit value of the water vapor permeability is generally 2000 to 5000 g/m²·h, because an excessively high water vapor permeability leads to increase in the amount of water permeated, so that the water resistance function is impaired, in general.

As a resin film satisfying the water resistance/water vapor permeability, it is possible to use a hydrophilic resin film of a polyurethane resin, a polyester resin, a silicone resin, a polyvinyl alcohol resin, or the like, or a porous film (hereinafter simply referred to as "hydrophobic porous film" in some cases) made of a hydrophobic resin such as a polyester resin, a polyolefin resin including polyethylene, polypropylene, and the like, a fluorine-containing resin, a polyurethane resin subjected to a water-repellent treatment, or the like. Here, the "hydrophobic resin" means a resin having a contact angle of a water droplet of 60 degrees or higher (measuring temperature: 25° C.), and more preferably 80 degrees or higher. The contact angle is a contact angle of a water droplet placed on a surface of a smooth and flat plate formed by using the resin.

In the hydrophobic porous film, a porous structure having inner pores (continuous pores) retains the water vapor permeability, while the hydrophobic resin constituting a film base material inhibits water from entering the pores. Thus, the film as a whole exhibits water resistance. Of these, a porous film made of a fluorine-containing resin is preferable as the water resistant/water vapor permeable film, and the above-described porous polytetrafluoroethylene film (hereinafter, referred to as "porous PTFE film" in some cases) is more preferable. In particular, a porous PTFE film is preferable, because the hydrophobicity (water repellency) of polytetrafluoroethylene, which is the resin component constituting the film base material, is high, so that an excellent water resistance and an excellent water vapor permeability can be both achieved.

As the water resistant/water vapor permeable non-woven fabric, it is possible to use a non-woven fabric of polyester, polypropylene, polyethylene, polyvinyl alcohol, polyamide, polyurethane, or the like. In particular, the fiber constituting the non-woven fabric is preferably an ultrafine fiber having a diameter of 1 µm or less. The non-woven fabric can be obtained by arranging fibers in a sheet-like shape by an electrospinning method, a melt-blowing method, a flash spinning method, a combined spinning method, or the like. In particular, the melt-blowing method or the electrospinning method is preferable, because the production of the ultrafine fiber can be easily controlled, and a non-woven fabric having desired characteristics can be easily obtained.

In the electrospinning method, a solution method or a melt method is used. The non-woven fabric can be formed by appropriately selecting one of the solution method and the melt method according to the component forming the fiber. For example, the non-woven fabric can be obtained by using an ultrafine fiber as follows. Specifically, a non-woven fabric of polyurethane can be obtained by a solution method using dimethylformamide as a solvent. A non-woven fabric of polyvinyl alcohol can be obtained by a solution method using water as a solvent. A non-woven fabric of a thermoplastic resin such as a polyester, a polyamide, or a thermoplastic polyurethane can be obtained by a melt method. Of these, polyurethane is preferably used because of the stretchability.

In addition, to improve the windbreaking ability or the water resistance/water vapor permeability, multiple sheets of any ones of these resin films and these non-woven fabrics may be stacked, and used as the middle layer.

In the present invention, the resin film or the non-woven fabric constituting the middle layer, the top layer which is one selected from a woven fabric, a knitted fabric, and a non-woven fabric, and the back cloth, which is the circular knitted fabric, can be stacked on each other by using a production technique such as a direct coating method on a cloth, or a lamination method in which a coating film is formed, and then boded onto a cloth with an adhesive agent or the like.

The direct coating method means that a resin is directly applied onto a surface of a cloth in a shape of a uniform thin film, and converted to a coating film. The direct coating method includes a wet method in which the conversion to the coating film is carried out bypassing through water, and a dry method in which the conversion to the coating film is carried out by drying. General methods for applying the resin include knife-over-roll coating, direct roll coating, reverse roll coating, gravure coating, and the like. The resin may be applied to have a desired film thickness by using any of these coating methods.

In the lamination method, an adhesive agent is applied onto a resin film or a non-woven fabric prepared in advance, and then a cloth is stacked thereon. General methods for applying the adhesive agent include knife-over-roll coating, direct roll coating, reverse roll coating, gravure coating, and the like. The adhesive agent may be applied to achieve a desired coating ratio by using any of these coating methods.

As the adhesive agent, it is possible to use a thermoplastic resin adhesive agent, as well as a curable-resin adhesive agent which reacts and is cured by heat or light, or the like. For example, a polyester resin, a polyamide resin, a polyurethane resin, a silicone resin, an acrylic resin, a polyvinyl chloride resin, a polyolefin resin, or the like can be used. Particularly when the laminated cloth of the present invention is used for a water resistant/water vapor permeable garment, an adhesive agent having a high water vapor permeability is preferable.

The coating ratio by the adhesive agent is not particularly limited. A higher coating ratio leads to a higher peel strength. For example, when the laminated cloth of the present invention is used for a water resistant/water vapor permeable garment, the entire surfaces may be bonded to each other with a coating ratio of 100%, if the adhesive agent has a high water vapor permeability. However, the coating ratio is preferably 20 to 80%, in general, considering the compatibility between the degree of waterproof property and the water vapor permeability. When the entire surfaces are bonded to each other with a coating ratio of 100%, a knife coater or the like is used. When the coating ratio is controlled to 20 to 80%, the adhesive agent can be applied by using a gravure coater or the like. The gravure coater is a method in which, for example, a roll having dot-shaped recessed portions carved on a surface thereof is used, and the adhesive agent is introduced into the recessed portions and transferred to the resin film for the processing. The coating ratio can be adjusted by adjusting the areas and depths of the recessed portions and the distance between the recessed portions.

Figure 5:
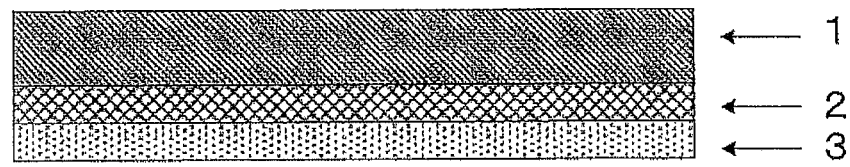
FIG. 5 is a schematic side view showing a model of an example of a structure of the laminated cloth of the present invention.

By using the above-described method, one selected from the group consisting of a woven fabric, a knitted fabric, and a non-woven fabric as the front surface layer, a resin film or a non-woven fabric as the middle layer, and a circular knitted fabric having knit stitches and tuck stitches as the back surface layer, in which filament yarn of 60 dtex or less is used in at least part of the circular knitted fabric, and the number of the tuck stitches is 9 to 72 per area of 12 wales×12 courses, are stacked on each other as shown in FIG. 5. Thus, the laminated cloth of the present invention can be obtained.

In addition, when the circular knitted fabric is a single circular knitted fabric, either a needle loop surface or a sinker loop surface can be used as the use-surface (the surface appearing on the surface after stacking) and may be selected as appropriate depending on a purpose.

The circular knitted fabric usable for the laminated cloth of the present invention has a mass per unit area of preferably 50 g/m$^2$ or less, more preferably 45 g/m$^2$ or less, further preferably 40 g/m$^2$ or less, and most preferably 35 g/m$^2$ or less. A mass per unit area exceeding 50 g/m$^2$ is not preferable, because the excessively heavy mass results in increased influence on the entire laminated cloth, and tends to impair the characteristics of the present invention, namely, light weight and high-performance characteristics. A lower limit is preferably 3 g/m$^2$ or higher, more preferably 5 g/m$^2$ or higher, and further preferably 7 g/m$^2$ or higher.

The circular knitted fabric usable for the laminated cloth of the present invention preferably has a cover factor (CF) in a range from 200 to 800, and more preferably in a range from 250 to 750. The cover factor can be calculated by the following formula.

$$CF = \{\sqrt{T} \times W\} + \{\sqrt{T} \times C\}$$

CF: cover factor
T: fineness (dtex) of constituent yarn
W: the number of wales per 2.54 cm
C: the number of courses per 2.54 cm Note that, for a double circular knitted fabric, the cover factor value on one surface and the cover factor value on the other surface are calculated, and the sum of these values is employed as the cover factor.

When the cover factor is less than 200, the density of the knitted fabric becomes so low that physical properties associated with resistance to tangling and abrasion and smoothness are impaired. When the cover factor exceeds 800, the density of the knitted fabric becomes so high that the high mass per unit area leads to increased influence on the entire laminated cloth, and it tends to be difficult to obtain a desired laminated cloth having a light weight and high performance.

EXAMPLES

Further detailed description is made below based on Examples. However, the present invention is not limited to these Examples. Note that physical properties were measured by the following methods in Examples.
(1) Number of Knit Stitches For a single circular knitted fabric, first, the number of wales, which was the number of stitches per 2.54 cm in the width direction of the knitted fabric, and the number of wales, which was the number of stitches per 2.54 cm in the longitudinal direction of the knitted fabric, were measured at three sites. Then, an average value of each of the numbers is calculated, and was rounded off to an integer. In the measurement, the length per 100 stitches was measured, and these values were converted to the number of stitches per 2.54 cm. Note that, when the number of courses of a structure in which wales having different numbers of stitches were present as shown in FIG. 8 or 9 was measured, the number of stitches was measured for each of the wales, and then the average value of these numbers of courses is calculated. A value calculated by multiplying the calculated number of wales by the calculated number of courses was employed as the number of the knit stitches per 6.45 cm$^2$.

For a double circular knitted fabric, the number of the knit stitches was determined as described in Description.

(2) Number of Tuck Stitches

For a single circular knitted fabric, the number of tuck stitches in one complete knitting cycle per 12 wales was converted to a value per 12 courses according to the following formula, and rounded off to one decimal place. This value was employed as the number of tuck stitches per area of 12 wales×12 courses.

$$AT=ST\times12/F$$

AT: The number of tuck stitches per area of 12 wales×12 courses

ST: The number of tuck stitches in one complete knitting cycle per 12 wales

F: The number of strands of yarn fed (the number of feeders) in one complete knitting cycle For a double circular knitted fabric, the number of tuck stitches was determined as described in Description.

(3) Air Permeability

The air permeability (cc/cm$^2$·sec) of a test piece was measured based on the method A (Frazier-type) of Japanese Industrial Standard (JIS) L 1096. The measurement was conducted five times, and the average value was calculated, and rounded off to one decimal place.

(4) Degree of Waterproof Property

The degree of waterproof property (cm) of a test piece was measured based on the method A of Japanese Industrial Standard (JIS) L 1092 (low-water pressure method). Here, the rate of water level rise was 600 mm/min±30 mm/min.

(5) Water Vapor Permeability

The water vapor permeability (g/m$^2$·h) was measured based on the method B-2 of Japanese Industrial Standard (JIS) L 1099 (alternative potassium acetate method).

(6) Mass Per Unit Area

The mass per unit area (g/m$^2$) of a test piece was measured based on Japanese Industrial Standard (JIS) L 1096.

(7) Durability Against Hook-and-Loop Fastener

A hook-and-loop fastener ("NEW ECOMAGIC" (registered trademark) manufactured by KURARAY FASTENING CO., LTD) was attached to a friction block of a wear tester type II described in Japanese Industrial Standard (JIS) L 0849 with a hook side of the fastener facing a test stage. On a test piece stage, a laminated cloth was mounted with the back surface layer (skin side layer) of the laminated cloth facing the friction block. In this state, a load of 2 N was applied to the friction block, and the fabric was rubbed with the friction block 100 times in the longitudinal direction or the transversal direction. Three sheets of the fabric were tested for each of the longitudinal direction and the transversal direction. The state of the rubbed portions of the test pieces was evaluated on the following four-grade scale, and the average value in each of the longitudinal direction and the transversal direction was calculated, and rounded off to an integer. Here, the calculations were made with the area of the rubbed portion being assumed to be 1995 mm$^2$ (105×19 mm).

<<Evaluation Criteria>>

Grade 1: The area where the fabric structure was disturbed was 15% or more of the rubbed portion.

Grade 2: The area where the fabric structure was disturbed was less than 15% of the rubbed portion.

Grade 3: The fabric structure was not disturbed, but fluff was observed slightly.

Grade 4: No change was observed.

(8) Texture

The texture was evaluated based on the following four-grade scale by 10 males and females in total, who compared the touch of the back surface between a conventional cloth and the laminated cloth. As the conventional cloth, a cloth of Comparative Example 4 was used, which was a laminated cloth using a tricot lining, which is generally and often used.

<<Evaluation Criteria>>

A: Better than the conventional cloth
B: Slightly better than the conventional cloth
C: At the same level as the conventional cloth
x: Poorer than the conventional cloth (9) Separability from the Skin The separability from the skin was evaluated as follows. Specifically, 0.3 cc of water was placed on the entire back surface of a sample of a laminated cloth of 10 cm in length×10 cm in width, and immediately thereafter, the laminated cloth was evaluated by touching with the hand. Ten males and females in total compared the laminated cloth with a conventional cloth to evaluate the separability from the skin on the following four-grade scale. As the conventional cloth, a cloth of Comparative Example 4 was used, which was a laminated cloth using a tricot lining, which is generally and often used.

<<Evaluation Criteria>>

A: Better than the conventional cloth
B: Slightly better than the conventional cloth
C: At the same level as the conventional cloth
D: Poorer than the conventional cloth

(10) Overall Evaluation as Laminated Cloth

<<Evaluation Criteria>>

B: Excellent as a laminated cloth
D: Poor as a laminated cloth

Example 1

For a front surface layer, a fabric was prepared by performing a water-repellent treatment with a fluorine-containing water repellent on a woven fabric (mass per unit area: 40 g/m$^2$) having a plain weave structure in which warp threads and weft threads were both constituted of untextured nylon yarn of 33 dtex and 26 filaments.

For a middle layer, a hydrophilic nonporous resin film (mass per unit area: 13 g/m$^2$) made of a polyurethane-based resin was prepared.

The hydrophilic nonporous resin film made of the polyurethane-based resin was bonded to one surface of the woven fabric by a lamination method using a polyurethane-based adhesive agent. Thus, a laminated cloth was obtained.

Further, a polyurethane-based adhesive agent was gravure printed on a film surface of the laminated cloth with a gravure coater to achieve a coating ratio of 45%. Then, a circular knitted fabric having the structure shown in FIG. 6 and being prepared for a back surface layer was laminated on the film surface of the laminated cloth. Here, in the circular knitted fabric, untextured nylon yarn of 17 dtex and 7 filaments was used and the number of tuck stitches per area of 12 wales×12 courses was 36. Thus, a laminated cloth of the present invention (mass per unit area: 90 g/m$^2$) was obtained.

The circular knitted fabric used for the back surface layer was knitted by using a single circular knitting machine, and finished by an ordinary dyeing method with 42 wales/2.54 cm, 89 courses/2.54 cm, and the number of knit stitches of 3,738/6.45 cm².

Tables 1 and 2 show evaluation results of the laminated cloth and the like.

In Table 1, "dtex" represents decitex, a unit of fineness, "f" represents the number of filaments contained in a single strand of the yarn. Also in Table 1, "NY" represents a polyamide fiber (nylon fiber), and "PE" represents a polyester fiber. Also in Table 1, "untextured yarn" represents unprocessed yarn, and "textured yarn" represents false-twist textured yarn.

Example 2

For a front surface layer, a fabric was prepared by performing a water-repellent treatment with a fluorine-containing water repellent on a woven fabric (mass per unit area: 40 g/m²) having a plain weave structure in which warp threads and weft threads were both constituted of untextured nylon yarn of 33 dtex and 26 filaments.

For a middle layer, a porous PTFE film (mass per unit area: 33 g/m²) was prepared. As a hydrophilic resin to be applied onto the porous PTFE film, a polyurethane prepolymer application liquid was prepared by adding ethylene glycol to a hydrophilic polyurethane resin to achieve a NCO/OH equivalence ratio of 1/0.9, followed by mixing and stirring. The polyurethane prepolymer application liquid was applied onto one surface of the porous PTFE film with a roll coater (was impregnate into part of a surface layer of the film). Subsequently, the film was placed in an oven adjusted to a temperature of 80° C. and a humidity of 80% RH for 1 hour, and the polyurethane prepolymer was cured by reaction with water. Thus, a hydrophilic polyurethane resin layer was formed on the one surface of the porous PTFE film.

A surface of the porous PTFE film on which the hydrophilic polyurethane resin layer was not present was bonded to one surface of the woven fabric by a lamination method using a polyurethane-based adhesive agent. Thus, a laminated cloth was obtained.

Further, a polyurethane-based adhesive agent was gravure printed on a film surface of the laminated cloth with a gravure coater to achieve a coating ratio of 40%. Then, a circular knitted fabric having the structure shown in FIG. 6 and being prepared for a back surface layer was laminated on the film surface of the laminated cloth. Here, in the circular knitted fabric, untextured nylon yarn of 9 dtex and 5 filaments was used, and the number of tuck stitches per area of 12 wales×12 courses was 36. Thus, a laminated cloth of the present invention (mass per unit area: 106 g/m²) was obtained.

The circular knitted fabric used for the back surface layer was knitted by using a single circular knitting machine, and finished by an ordinary dyeing method with 82 wales/2.54 cm, 81 courses/2.54 cm, and the number of the knit stitches of 6,642/6.45 cm².

Tables 1 and 2 show evaluation results of the laminated cloth and the like.

Example 3

For a front surface layer, a fabric was prepared by performing a water-repellent treatment with a fluorine-containing water repellent on a woven fabric (mass per unit area: 40 g/m²) having a plain weave structure in which warp threads and weft threads were both constituted of untextured nylon yarn of 33 dtex and 26 filaments.

For a middle layer, a porous PTFE film (mass per unit area: 33 g/m²) was prepared. As a hydrophilic resin to be applied onto the porous PTFE film, a polyurethane prepolymer application liquid was prepared by adding ethylene glycol to a hydrophilic polyurethane resin to achieve a NCO/OH equivalence ratio of 1/0.9, followed by mixing and stirring. The polyurethane prepolymer application liquid was applied onto one surface of the porous PTFE film with a roll coater (was impregnate into part of a surface layer of the film). Subsequently, the film was placed in an oven adjusted to a temperature of 80° C. and a humidity of 80% RH for 1 hour, and the polyurethane prepolymer was cured by reaction with water. Thus, a hydrophilic polyurethane resin layer was formed on the one surface of the porous PTFE film.

A surface of the porous PTFE film on which the hydrophilic polyurethane resin layer was not present was bonded to one surface of the woven fabric by a lamination method using a polyurethane-based adhesive agent. Thus, a laminated cloth was obtained.

Figure 7:
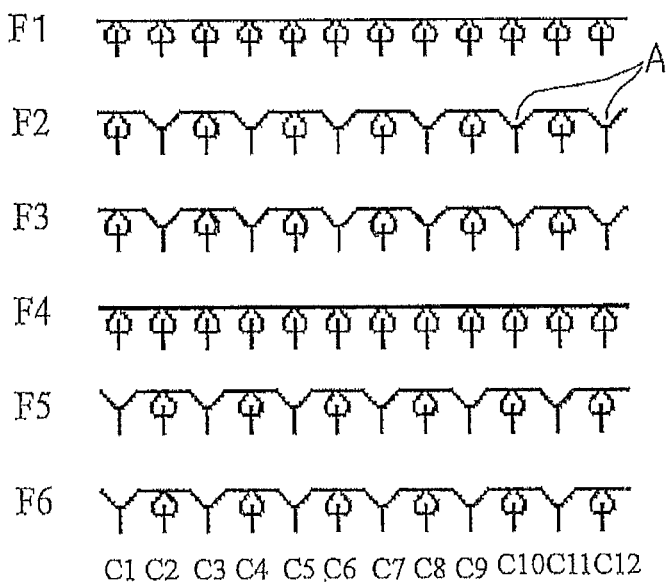
FIG. 7 is a structural diagram showing a single circular knitted fabric used in another example of the laminated cloth of the present invention.

Further, a polyurethane-based adhesive agent was gravure printed on a film surface of the laminated cloth with a gravure coater to achieve a coating ratio of 40%. Then, a circular knitted fabric having the structure shown in FIG. 7 and being prepared for a back surface layer was laminated on the film surface of the laminated cloth. Here, in the circular knitted fabric, untextured nylon yarn of 17 dtex and 7 filaments was used, and the number of tuck stitches per area of 12 wales×12 courses was 48. Thus, a laminated cloth of the present invention (mass per unit area: 115 g/m²) was obtained.

The circular knitted fabric used for the back surface layer was knitted by using a single circular knitting machine, and finished by an ordinary dyeing method with 49 wales/2.54 cm, 87 courses/2.54 cm, and the number of the knit stitches of 4,263/6.45 cm².

Tables 1 and 2 show evaluation results of the laminated cloth and the like.

Example 4

For a front surface layer, a fabric was prepared by performing a water-repellent treatment with a fluorine-containing water repellent on a circular knitted fabric (mass per unit area: 56 g/m²) having a smooth structure constituted of false-twist textured polyester yarn of 22 dtex and 24 filaments.

For a middle layer, a hydrophilic nonporous resin film (mass per unit area: 13 g/m²) made of a polyurethane-based resin was prepared.

The hydrophilic nonporous resin film made of the polyurethane-based resin was bonded to one surface of the woven fabric by a lamination method using a polyurethane-based adhesive agent. Thus, a laminated cloth was obtained.

Further, a polyurethane-based adhesive agent was gravure printed on a film surface of the laminated cloth with a gravure coater to achieve a coating ratio of 45%. Then, a circular knitted fabric having the structure shown in FIG. 8 and being prepared for a back surface layer was laminated on the film surface of the laminated cloth. In the circular knitted fabric, untextured yarn polyester of 22 dtex and 12 filaments was used, and the number of tuck stitches per area of 12 wales×12 courses was 27. Thus, a laminated cloth of the present invention (mass per unit area: 117 g/m²) was obtained.

The circular knitted fabric used for the back surface layer was knitted by using a single circular knitting machine, and finished by an ordinary dyeing method with 59 wales/2.54 cm, 83 courses/2.54 cm, and the number of the knit stitches of 4,897/6.45 cm$^2$.

Tables 1 and 2 show evaluation results of the laminated cloth and the like.

Example 5

For a front surface layer, a fabric was prepared by performing a water-repellent treatment with a fluorine-containing water repellent on a woven fabric (mass per unit area: 40 g/m$^2$) having a plain weave structure in which warp threads and weft threads were both constituted of untextured nylon yarn of 33 dtex and 26 filaments.

For a middle layer, a porous PTFE film (mass per unit area: 33 g/m$^2$) was prepared. As a hydrophilic resin to be applied onto the porous PTFE film, a polyurethane prepolymer application liquid was prepared by adding ethylene glycol to a hydrophilic polyurethane resin to achieve a NCO/OH equivalence ratio of 1/0.9, followed by mixing and stirring. The polyurethane prepolymer application liquid was applied onto one surface of the porous PTFE film with a roll coater (was impregnate into part of a surface layer of the film). Subsequently, the film was placed in an oven adjusted to a temperature of 80° C. and a humidity of 80% RH for 1 hour, and the polyurethane prepolymer was cured by reaction with water. Thus, a hydrophilic polyurethane resin layer was formed on the one surface of the porous PTFE film.

A surface of the porous PTFE film on which the hydrophilic polyurethane resin layer was not present was bonded to one surface of the woven fabric by a lamination method using a polyurethane-based adhesive agent. Thus, a laminated cloth was obtained.

Further, a polyurethane-based adhesive agent was gravure printed on a film surface of the laminated cloth with a gravure coater to achieve a coating ratio of 40%. Then, a circular knitted fabric having the structure shown in FIG. 6 and being prepared for a back surface layer was laminated on the film surface of the laminated cloth. Here, in the circular knitted fabric, untextured nylon yarn of 22 dtex and 7 filaments and untextured nylon yarn of 17 dtex and 7 filaments were used, and the number of tuck stitches per area of 12 wales×12 courses was 36. Thus, a laminated cloth of the present invention (mass per unit area: 112 g/m$^2$) was obtained.

The circular knitted fabric used for the back surface layer was knitted by using a single circular knitting machine in such a manner that the untextured nylon yarn of 22 dtex and 7 filaments was used for the structures of F1 and F3 in FIG. 6 and the untextured nylon yarn of 17 dtex and 7 filaments was used for the structures of F2 and F4, and then the circular knitted fabric was finished by an ordinary dyeing method with 43 wales/2.54 cm, 96 courses/2.54 cm, and the number of the knit stitches 4,128/6.45 cm$^2$.

Tables 1 and 2 show evaluation results of the laminated cloth and the like.

Example 6

For a front surface layer, a fabric was prepared by performing a water-repellent treatment with a fluorine-containing water repellent on a woven fabric (mass per unit area: 40 g/m$^2$) having a plain weave structure in which warp threads and weft threads were both constituted of untextured nylon yarn of 33 dtex and 26 filaments.

For a middle layer, a hydrophilic nonporous resin film (mass per unit area: 13 g/m$^2$) made of a polyurethane-based resin was prepared.

The hydrophilic nonporous resin film made of the polyurethane-based resin was bonded to one surface of the woven fabric by a lamination method using a polyurethane-based adhesive agent. Thus, a laminated cloth was obtained.

Further, a polyurethane-based adhesive agent was gravure printed on a film surface of the laminated cloth with a gravure coater to achieve a coating ratio of 45%. Then, a circular knitted fabric having the structure shown in FIG. 6 and being prepared for a back surface layer was laminated on the film surface of the laminated cloth. Here, in the circular knitted fabric, untextured nylon yarn of 44 dtex and 34 filaments was used, and the number of tuck stitches per area of 12 wales×12 courses was 36. Thus, a laminated cloth of the present invention (mass per unit area: 111 g/m$^2$) was obtained.

The circular knitted fabric used for the back surface layer was knitted by using a single circular knitting machine, and finished by an ordinary dyeing method with 40 wales/2.54 cm, 59 courses/2.54 cm, and the number of the knit stitches of 2,360/6.45 cm$^2$.

Tables 1 and 2 show evaluation results of the laminated cloth and the like.

Comparative Example 1

For a front surface layer, a fabric was prepared by performing a water-repellent treatment with a fluorine-containing water repellent on a woven fabric (mass per unit area: 40 g/m$^2$) having a plain weave structure in which warp threads and weft threads were both constituted of untextured nylon yarn of 33 dtex and 26 filaments.

For a middle layer, a hydrophilic nonporous resin film (mass per unit area: 13 g/m$^2$) made of a polyurethane-based resin was prepared.

The hydrophilic nonporous resin film made of the polyurethane-based resin was bonded to one surface of the woven fabric by a lamination method using a polyurethane-based adhesive agent. Thus, a laminated cloth was obtained.

Further, a polyurethane-based adhesive agent was gravure printed on a film surface of the laminated cloth with a gravure coater to achieve a coating ratio of 45%. Then, a circular knitted fabric having the structure shown in FIG. 6 and prepared for a back surface layer was laminated on the film surface of the laminated cloth. Here, in the circular knitted fabric, false-twist textured polyester yarn of 22 dtex and 24 filaments was used, and the number of tuck stitches per area of 12 wales×12 courses was 36. Thus, a laminated cloth (mass per unit area: 89 g/m$^2$) was obtained.

The circular knitted fabric used for the back surface layer was knitted by using a single circular knitting machine, and finished by an ordinary dyeing method with 34 wales/2.54 cm, 55 courses/2.54 cm, and the number of the knit stitches of 1,870/6.45 cm$^2$.

Tables 1 and 2 show evaluation results of the laminated cloth and the like.

Comparative Example 2

For a front surface layer, a fabric was prepared by performing a water-repellent treatment with a fluorine-containing water repellent on a woven fabric (mass per unit area: 40 g/m$^2$) having a plain weave structure in which warp threads and weft threads were both constituted of untextured nylon yarn of 33 dtex and 26 filaments.

For a middle layer, a hydrophilic nonporous resin film (mass per unit area: 13 g/m$^2$) made of a polyurethane-based resin was prepared.

The hydrophilic nonporous resin film made of the polyurethane-based resin was bonded to one surface of the woven fabric by a lamination method using a polyurethane-based adhesive agent. Thus, a laminated cloth was obtained.

Further, a polyurethane-based adhesive agent was gravure printed on a film surface of the laminated cloth with a gravure coater to achieve a coating ratio of 45%. Then, a circular knitted fabric having the structure shown in FIG. 9 and being prepared for a back surface layer was laminated on the film surface of the laminated cloth. Here, in the circular knitted fabric, untextured nylon yarn of 17 dtex and 7 filaments was used, and the number of tuck stitches per area of 12 wales×12 courses was 7.2. Thus, a laminated cloth (mass per unit area: 94 g/m$^2$) was obtained.

The circular knitted fabric used for the back surface layer was knitted by using a single circular knitting machine, and finished by an ordinary dyeing method with 58 wales/2.54 cm, 96 courses/2.54 cm, and the number of the knit stitches of 5,568/6.45 cm$^2$.

Tables 1 and 2 show evaluation results of the laminated cloth and the like.

Comparative Example 3

For a front surface layer, a fabric was prepared by performing a water-repellent treatment with a fluorine-containing water repellent on a woven fabric (mass per unit area: 40 g/m$^2$) having a plain weave structure in which warp threads and weft threads were both constituted of untextured nylon yarn of 33 dtex and 26 filaments.

For a middle layer, a hydrophilic nonporous resin film (mass per unit area: 13 g/m$^2$) made of a polyurethane-based resin was prepared.

The hydrophilic nonporous resin film made of the polyurethane-based resin was bonded to one surface of the woven fabric by a lamination method using a polyurethane-based adhesive agent. Thus, a laminated cloth was obtained.

Further, a polyurethane-based adhesive agent was gravure printed on a film surface of the laminated cloth with a gravure coater to achieve a coating ratio of 45%. Then, a circular knitted fabric of plain stitches prepared for a back surface layer was laminated on the film surface of the laminated cloth. Here, in the circular knitted fabric, untextured nylon yarn of 44 dtex and 34 filaments was used, and the number of tuck stitches per area of 12 wales×12 courses was 0. Thus, a laminated cloth (mass per unit area: 133 g/m$^2$) was obtained.

The circular knitted fabric used for the back surface layer was knitted by using a single circular knitting machine, and finished by an ordinary dyeing method with 64 wales/2.54 cm, 80 courses/2.54 cm, and the number of the knit stitches of 5,120/6.45 cm$^2$.

Tables 1 and 2 show evaluation results of the laminated cloth and the like.

Comparative Example 4

For a front surface layer, a fabric was prepared by performing a water-repellent treatment with a fluorine-containing water repellent on a woven fabric (mass per unit area: 40 g/m$^2$) having a plain weave structure in which warp threads and weft threads were both constituted of untextured nylon yarn of 33 dtex and 26 filaments.

For a middle layer, a hydrophilic nonporous resin film (mass per unit area: 13 g/m$^2$) made of a polyurethane-based resin was prepared.

The hydrophilic nonporous resin film made of the polyurethane-based resin was bonded to one surface of the woven fabric by a lamination method using a polyurethane-based adhesive agent. Thus, a laminated cloth was obtained.

Further, a polyurethane-based adhesive agent was gravure printed on a film surface of the laminated cloth with a gravure coater to achieve a coating ratio of 45%. Then, a warp-knitted fabric having half tricot stitches and being prepared for a back surface layer was laminated on the film surface of the laminated cloth. Here, untextured nylon yarn of 22 dtex and 7 filaments was used in the warp-knitted fabric. Thus, a laminated cloth (mass per unit area: 104 g/m$^2$) was obtained.

The circular knitted fabric used for the back surface layer was knitted by using a tricot knitting machine, and finished by an ordinary dyeing method with 31 wales/2.54 cm, 45 courses/2.54 cm, and the number of the knit stitches of 1,395/6.45 cm$^2$.

Tables 1 and 2 show evaluation results of the laminated cloth and the like.

TABLE 1

| | Laminate mass per unit area (g/m$^2$) | Front fabric (Front surface layer) | | | | Middle layer (Intermediate layer) | | | |
| | | Original yarn used | Type of fabric | Mass per unit area (g/m$^2$) | Type | Mass per unit area (g/m$^2$) | Air permeability (cc/cm$^2$ · sec) | Degree of waterproof property (cm) | Water vapor permeability (g/m$^2$ · h) |
|---|---|---|---|---|---|---|---|---|---|
| Ex. 1 | 90 | 33dtex26f NY/untextured yarn | Woven fabric | 40 | Hydrophilic polyurethane resin film | 13 | 0.0 | ≥300 | 600 |
| Ex. 2 | 106 | 33dtex26f NY/untextured yarn | Woven fabric | 40 | Porous PTFE film | 33 | 0.0 | ≥300 | 600 |
| Ex. 3 | 115 | 33dtx26f NY/untextured yarn | Woven fabric | 40 | Porous PTFE film | 33 | 0.0 | ≥300 | 600 |
| Ex. 4 | 117 | 22dtex24f PE/textured yarn | Circular knitted fabric | 56 | Hydrophilic polyurethane resin film | 13 | 0.0 | ≥300 | 600 |

TABLE 1-continued

| | Laminate mass per unit area (g/m²) | Front fabric (Front surface layer) | | | Middle layer (Intermediate layer) | | | | |
|---|---|---|---|---|---|---|---|---|---|
| | | Original yarn used | Type of fabric | Mass per unit area (g/m²) | Type | Mass per unit area (g/m²) | Air permeability (cc/cm² · sec) | Degree of waterproof property (cm) | Water vapor permeability (g/m² · h) |
| Ex. 5 | 112 | 33dtex26f NY/untextured yarn | Woven fabric | 40 | Porous PTFE film | 33 | 0.0 | ≥300 | 600 |
| Ex. 6 | 111 | 33dtex26f NY/untextured yarn | Woven fabric | 40 | Hydrophilic polyurethane resin film | 13 | 0.0 | ≥300 | 600 |
| Comp. Ex. 1 | 89 | 33dtex26f NY/untextured yarn | Woven fabric | 40 | Hydrophilic polyurethane resin film | 13 | 0.0 | ≥300 | 600 |
| Comp. Ex. 2 | 94 | 33dtex26f NY/untextured yarn | Woven fabric | 40 | Hydrophilic polyurethane resin film | 13 | 0.0 | ≥300 | 600 |
| Comp. Ex. 3 | 133 | 33dtex26f NY/untextured yarn | Woven fabric | 40 | Hydrophilic polyurethane resin film | 13 | 0.0 | ≥300 | 600 |
| Comp. Ex. 4 | 104 | 33dtex26f NY/untextured yarn | Woven fabric | 40 | Hydrophilic polyurethane resin film | 13 | 0.0 | ≥300 | 600 |

TABLE 2

| | Back fabric (Back surface layer) | | | Number of knit stitches (stitches/ 6.45 cm²) | Cover factor | Texture | Durability (grade) | | Separability from skin | Overall evaluation |
|---|---|---|---|---|---|---|---|---|---|---|
| | Original yarn used | Number of tuck stitches per area of 12 wales × 12 courses | Mass per unit area (g/m²) | | | | Longitudinal direction | Transversal direction | | |
| Ex. 1 | 17dtex7f NY/untextured yarn | 36.0 | 16 | 3,738 | 540 | B | 4 | 3 | B | B |
| Ex. 2 | 9dtex5f NY/untextured yarn | 36.0 | 13 | 6,642 | 489 | A | 3 | 3 | B | B |
| Ex. 3 | 17dtx7f NY/untextured yarn | 48.0 | 22 | 4,263 | 560 | B | 3 | 2 | A | B |
| Ex. 4 | 22dtex12f PE/untextured yarn | 27.0 | 27 | 4,897 | 666 | B | 3 | 3 | B | B |
| Ex. 5 | 22dtex7f NY/untextured yarn 17dtex7f NY/untextured yarn | 36.0 | 19 | 4,128 | 614 | B | 4 | 3 | B | B |
| Ex. 6 | 44dtex34f NY/untextured yarn | 36.0 | 34 | 2,360 | 657 | B | 4 | 3 | B | B |
| Comp. Ex. 1 | 22dtex24f-PE/textured yarn | 36.0 | 15 | 1,870 | 417 | B | 2 | 1 | B | D |
| Comp. Ex. 2 | 17dtex7f NY/untextured yarn | 7.2 | 20 | 5,568 | 746 | A | 3 | 3 | D | D |
| Comp. Ex. 3 | 44dtex34f NY/untextured yarn | 0.0 | 59 | 5,120 | 955 | A | 4 | 4 | D | D |
| Comp. Ex. 4 | 22dtex7f NY/untextured yarn | — | 30 | 1,395 | — | C | 1 | 1 | C | D |

INDUSTRIAL APPLICABILITY

In applications for garments which are required to have windbreaking ability, water resistance/water vapor permeability, or the like, the present invention makes it possible to obtain a laminated cloth in which a back surface has good texture, separability from the skin, and physical properties associated with resistance to tangling and abrasion. The laminated cloth can be used in applications for various garments.

EXPLANATION OF REFERENCE NUMERALS

A tuck stitch
B to D knit stitches
a to d and f to h stitches
e strand in a portion where a knit stitch was formed
F1 to F4 yarn feed numbers of knitting machine
C1 to C12 cylinder needle row
i, j, k, l constituent strands of yarn
1 front surface layer of laminated cloth
2 middle layer of laminated cloth
3 back surface layer of laminated cloth

The invention claimed is:

1. A laminated cloth comprising:
   a front surface layer,
   a middle layer, and
   a back surface layer,
   wherein the front surface layer, the middle layer and the back surface layer are stacked on each other,
   wherein the front surface layer comprises one or more of a woven fabric, a knitted fabric, or a non-woven fabric,
   wherein the middle layer comprises a resin film,
   wherein the resin film has a water vapor permeability of 50 g/m$^2$·h or more as measured by the method B-2 of JIS L 1099,
   wherein the back surface layer comprises a circular knitted fabric having knit stitches and tuck stitches,
   wherein the circular knitted fabric has a mass per unit area in the range of 12 to 20 g/m$^2$,
   wherein the number of knit stitches of the circular knitted fabric is in the range of 3500 to 6800 per 6.45 cm$^2$,
   wherein the circular knitted fabric comprises a filament yarn of 60 dtex or less, and
   wherein the number of the tuck stitches of the circular knitted fabric is in the range of 35 to 37 per area of 12 wales×12 courses.

2. The laminated cloth according to claim 1, wherein the circular knitted fabric is a single circular knitted fabric.

3. The laminated cloth according to claim 1, wherein the filament yarn has a fineness of 36 dtex or less.

4. The laminated cloth according to claim 1, wherein two or more types of filament yarn are used as the filament yarn.

5. The laminated cloth according to claim 1, wherein two or more types of filament yarn having different finenesses are used as the filament yarn.

6. The laminated cloth according to claim 1, wherein the middle layer is obtained by using a resin film having an air permeability of 50 cc/cm$^2$ sec or less, the air permeability being measured by the method A (Frazier-type) of Japanese Industrial Standard (JIS) L 1096.

7. The laminated cloth according to claim 1, wherein the middle layer is obtained by using a resin film having a degree of waterproof property (water resistance) of 100 cm or more and a water vapor permeability of 50 g/m$^2$·h or more, the degree of waterproof property being measured by the method A of Japanese Industrial Standard (JIS) L 1092, the water vapor permeability being measured by the method B-2 of JIS L 1099.

8. The laminated cloth according to claim 1, wherein the circular knitted fabric has a cover factor (CF) of 200 to 800.

* * * * *